United States Patent
Johnson

(10) Patent No.: US 7,933,572 B1
(45) Date of Patent: Apr. 26, 2011

(54) METHOD AND SYSTEM FOR COMMUNICATING BETWEEN A REMOTE ANTENNA SYSTEM AND A CELLULAR BASE STATION VIA A CABLE TELEVISION NETWORK

(75) Inventor: Harold Wayne Johnson, Roach, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1422 days.

(21) Appl. No.: 11/234,982

(22) Filed: Sep. 26, 2005

(51) Int. Cl.
*H04B 1/18* (2006.01)

(52) U.S. Cl. ............... 455/153.2; 455/127.4; 455/151.2; 455/554.1; 725/111; 725/131

(58) Field of Classification Search .................. 455/562, 455/426.2, 102
See application file for complete search history.

(56) References Cited

U.S. PATENT DOCUMENTS

| | | | |
|---|---|---|---|
| 5,381,459 A | | 1/1995 | Lappington ..................... 379/56 |
| 5,432,838 A | | 7/1995 | Purchase ......................... 379/55 |
| 5,828,946 A | * | 10/1998 | Feisullin et al. .............. 725/106 |
| 5,953,670 A | * | 9/1999 | Newson ........................ 455/454 |
| 7,050,399 B2 | * | 5/2006 | Masuda ........................ 370/245 |
| 7,280,824 B2 | * | 10/2007 | Shoji et al. .................... 455/418 |
| 7,353,004 B2 | * | 4/2008 | Francesca et al. ............ 455/102 |
| 2002/0147978 A1 | * | 10/2002 | Dolgonos et al. ............... 725/62 |
| 2002/0173268 A1 | * | 11/2002 | Heinzmann .................. 455/3.05 |
| 2004/0213299 A1 | * | 10/2004 | Gupta et al. ................... 370/539 |
| 2005/0117608 A1 | * | 6/2005 | Karakawa et al. ............ 370/486 |
| 2005/0147121 A1 | * | 7/2005 | Burrell et al. ................. 370/468 |
| 2005/0283816 A1 | * | 12/2005 | Weinstein et al. ............ 725/129 |
| 2007/0076746 A1 | * | 4/2007 | Faska et al. ................... 370/463 |

FOREIGN PATENT DOCUMENTS

WO    WO 0156289 A1 *   8/2001

OTHER PUBLICATIONS

Wong, "Eliminate the Backhaul Link," AirNet Feature Story (Oct. 1, 1999). (www.aircom.com/pn_feature.htm).
"AirSite Backhaul Free Base Station," AirNet. (www.aircom.com/pr_airsite.htm).
"AdaptaCell Broadband, Software-Defined Base Station," AirNet (www.aircom.com/pr_adaptacell.htm).
"Cellular Backhaul Using Wireless Mesh Topologies" InterWave (2002).
"CrossPATH," Kentrox (www.kentrox.com/products/crosspath_2/index.asp).
Wong, "Filling the Generation Gap with Software-Defined, Broadband Radio," CTI (vol. 4, No. 9).
"MIKOM U.S. Announces Immediate Availability of Multiple Solutions for the Most Flexible wireless Signal distribution System: The Base Station Hotel," Andrew (Aug. 19, 2003). www.mikomus.com/newsrm/030113.html.

(Continued)

*Primary Examiner* — Charles N Appiah
*Assistant Examiner* — Randy Peaches

(57) ABSTRACT

A typical cable television (CATV) network can be used as a communication link between a remote antenna system and a cellular base station (BTS). To do so, capacity of the typical CATV network is expanded to add use of an additional frequency spectrum, the added frequency is then divided into frequency channels (bands) of which each channel is digitized (e.g., using QAM) to produce a certain amount data bandwidth per channel, and a certain number of those channels are concatenated together to provide an aggregate data channel for carrying traffic between the cellular BTS and the remote antenna system (e.g., a distributed antenna system (DAS)).

20 Claims, 5 Drawing Sheets

OTHER PUBLICATIONS

"Minimizing Backhaul Circuit Charges in Wireless Networks," Integrating Multiple Cell Site Traffic onto a Single T1 Link with CrossPATH II ISCU (Jun. 1999).
"Ogier Electronics," (Aug. 19, 2003) (www.ogierelectronics.com/broad-2htm).
"Rural Daisy Chained Base Stations," (Aug. 19, 2003). www.ogierelectronics.com/broad-pic2.htm.
Lee, "Reliable Daisy-Chain Designs," Wireless Review (Jan. 1, 2000). www.wirelessreview.com/ar/wireless_reliable_daisychain_designs/.
Xtend Networks, http://www.xtendnetworks.com/index.htm (Nov. 15, 2005).

* cited by examiner

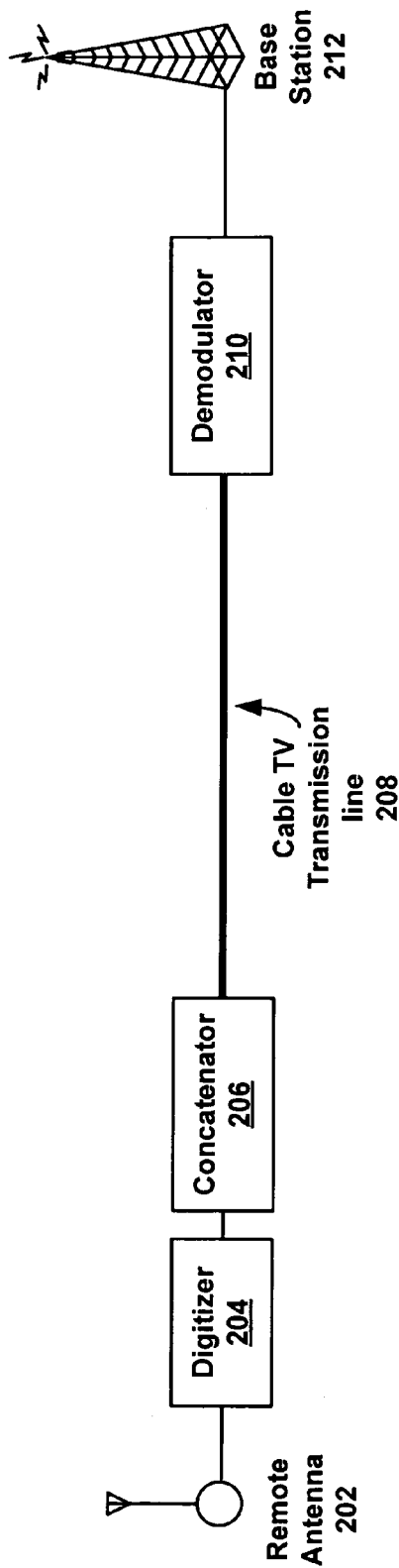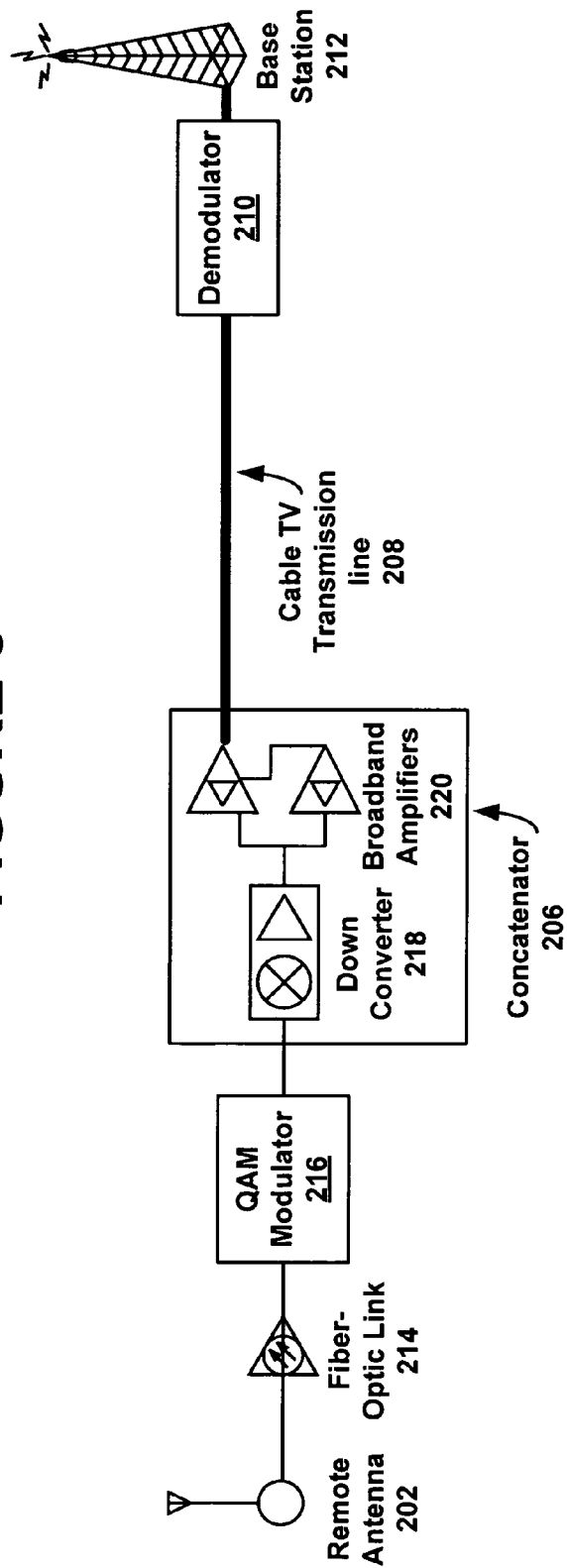

METHOD AND SYSTEM FOR COMMUNICATING BETWEEN A REMOTE ANTENNA SYSTEM AND A CELLULAR BASE STATION VIA A CABLE TELEVISION NETWORK

FIELD OF INVENTION

The present invention relates to communications, and more particularly, to establishing a communication link between a remote antenna system and a cellular base station via a cable television network.

BACKGROUND

Wireless communication is an increasingly popular means of personal communication in the modern world. People are using wireless networks for the exchange of voice and data as an alternative to using a wire infrastructure. In principle, a user can seek information over the Internet or call anyone over a public switched telephone network (PSTN) from any place inside the coverage area of the wireless network.

In a typical wireless network, an area is divided geographically into a number of cell sites, each defined by one or more radiation patterns created by an emission of radio frequency (RF) electromagnetic waves from a respective base transceiver station (BTS) antenna. For wireless communications, RF signals are not sent through a transmission line and, therefore, antennas are required for the transmission and reception of the signals.

Cellular networks provide a communications path between each subscriber's mobile phone and a mobile switching center (MSC). The MSC manages communications to and from mobile phones in a variety of locations. Typically, several base stations are affiliated with each MSC, and each mobile phone communicates through a BTS that is nearby relative to other base stations. As the mobile phone changes location (when, for example, its user is driving in a car), it may also change the BTS through which it communicates.

Each BTS has a backhaul facility, through which it communicates with the MSC to carry mobile telephone conversations within the cell. The backhaul facility typically communicates with the MSC through either a microwave link or a terrestrial wire, such as a T-1 line.

To provide a high quality of mobile phone service, it is desirable for cells to be adjacent to one another, leaving no intermediate gaps in which cellular phone service is unavailable. Likewise, each cell could be arranged such that its corresponding BTS has the capacity to handle all the telephone conversations carried out by users at peak times within the cell. Thus, a central business district in which many mobile telephones are used during the business day is typically provided with a higher density of base stations, each with a smaller cell, than in outlying areas.

Designing a cellular network for a high quality of service involves a number of issues. For example, to avoid gaps in service areas, so-called "coverage holes," it may appear desirable to design larger cells that are served by base stations with high-power antennas. However, the larger cell would encompass more subscribers and may cause calls to be dropped if the capacity of the BTS is exceeded. Another solution—increasing the number (and, accordingly, the density) of base stations—entails a financial expense, the regulatory and architectural challenge of finding (and leasing) a desirable location for each BTS, and the task of arranging for backhaul communications from each new BTS to the MSC.

To provide flexibility in the design of mobile telephone networks, remote antenna systems or distributed antenna systems (DAS) have been utilized. One example remote antenna system is the digivance long-range coverage solution (LRCS), from ADC Telecommunications, Inc., of Minneapolis, Minn.

A remote antenna system may correspond to a particular BTS, but it can be positioned remotely from its corresponding BTS. Several remote antennas can be associated with each BTS, allowing the cell associated with the BTS to extend into controlled areas. For example, if the mobile telephone service provider determines that there is a coverage hole between two existing cells, it can position a remote antenna within that hole and associate that remote antenna with an existing BTS.

Remote antenna systems may also be used to bring RF coverage inside and throughout a facility, underground (for example, within tunnels), or anywhere that outdoor RF signals do not reach. Prior to the development of an in-building wireless (IBW) network or a DAS, in order to access the cellular network from inside a building one had to hope that a local cellular carrier's network could penetrate exterior and interior walls of the building from the outside. More often than not, one would need to go outside to make or receive a call.

A remote antenna system or DAS varies from a small repeater or enhancer system providing service for individual subscribers or covering two or three floors of a small office block to large scale systems using a BTS to cover indoor and outdoor coverage areas. A DAS uses fiber cable within buildings to actively distribute signals to a network of small powered antennas. The system still requires a BTS in the building or nearby, but allows for signals to be sent throughout the building more efficiently and more reliably by transmitting the signals from multiple locations within the building. As such, a DAS may comprise, for example, any network of components that receives an input RF signal from a BTS, converts it to wired (e.g., copper wire, optical, coax, etc.) or possibly wireless media, transports it throughout a facility, and then re-converts it back to an RF signal for transmission inside the facility.

Although remote antenna systems provide additional flexibility to mobile telephone service providers, the service provider operating in the cellular network must still arrange for communications between the BTS and the remote antenna system. These communications typically take place over a fiber optic line. As a result, the service provider typically must arrange for a terrestrial path between the remote antenna system and the BTS.

SUMMARY

Within embodiments described below, a method of communicating between a remote antenna and a cellular wireless base station (BTS) via a cable television (CATV) distribution network is presented. The method includes digitizing data channels of the CATV distribution network to produce a certain amount data bandwidth per channel, and concatenating a plurality of the digitized channels together to provide an aggregate data channel for carrying traffic between the cellular wireless BTS and the remote antenna.

In another embodiment, the method may include receiving at the remote antenna signals from mobile devices, encapsulating data within the signals using the generic framing procedure (GFP), and digitizing the encapsulated data. Further, the method includes virtually concatenating a plurality of channels of the CATV distribution network to provide an aggregate data channel for carrying the encapsulated data between the cellular wireless BTS and the remote antenna, and sending the encapsulated data from the remote antenna to the cellular wireless BTS via the concatenated channels of the CATV distribution network.

In another respect, a system for providing a communication link between a remote antenna and a cellular base station is provided. The system includes a cellular wireless base station, a remote antenna and a cable television distribution network. The cellular wireless base station produces a respective radiation pattern defining a cell site within which mobile devices may communicate wirelessly with the cellular wireless base station. The remote antenna is coupled to the cellular wireless base station and extends a coverage area of the cell site. The cable television distribution network provides a communication link between the remote antenna and the cellular wireless base station. Data channels of the cable television distribution network are digitized to produce a certain amount data bandwidth per channel and a plurality of the digitized channels are then concatenated together to provide an aggregate data channel for carrying data between the cellular wireless BTS and the remote antenna.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

BRIEF DESCRIPTION OF FIGURES

FIG. 3 illustrates one embodiment of a CATV network providing a communication link between a remote antenna and a cellular base station.

FIG. 4 illustrates another embodiment of a CATV network providing a communication link between a remote antenna and a cellular base station.

DETAILED DESCRIPTION OF EXEMPLARY EMBODIMENTS

Generally, a typical cable television (CATV) network can be used as a communication link between a remote antenna system and a cellular base station (BTS). To do so, capacity of the typical CATV network is expanded to add use of additional frequency spectrum, the added frequency is then divided into frequency channels (bands) of which each channel is digitized (e.g., using QAM) to produce a certain amount data bandwidth per channel, and a certain number of those digitized channels are aggregated together to provide an aggregate data channel for carrying data traffic between the cellular BTS and the remote antenna system (e.g., or a distributed antenna system (DAS)).

Figure 1:
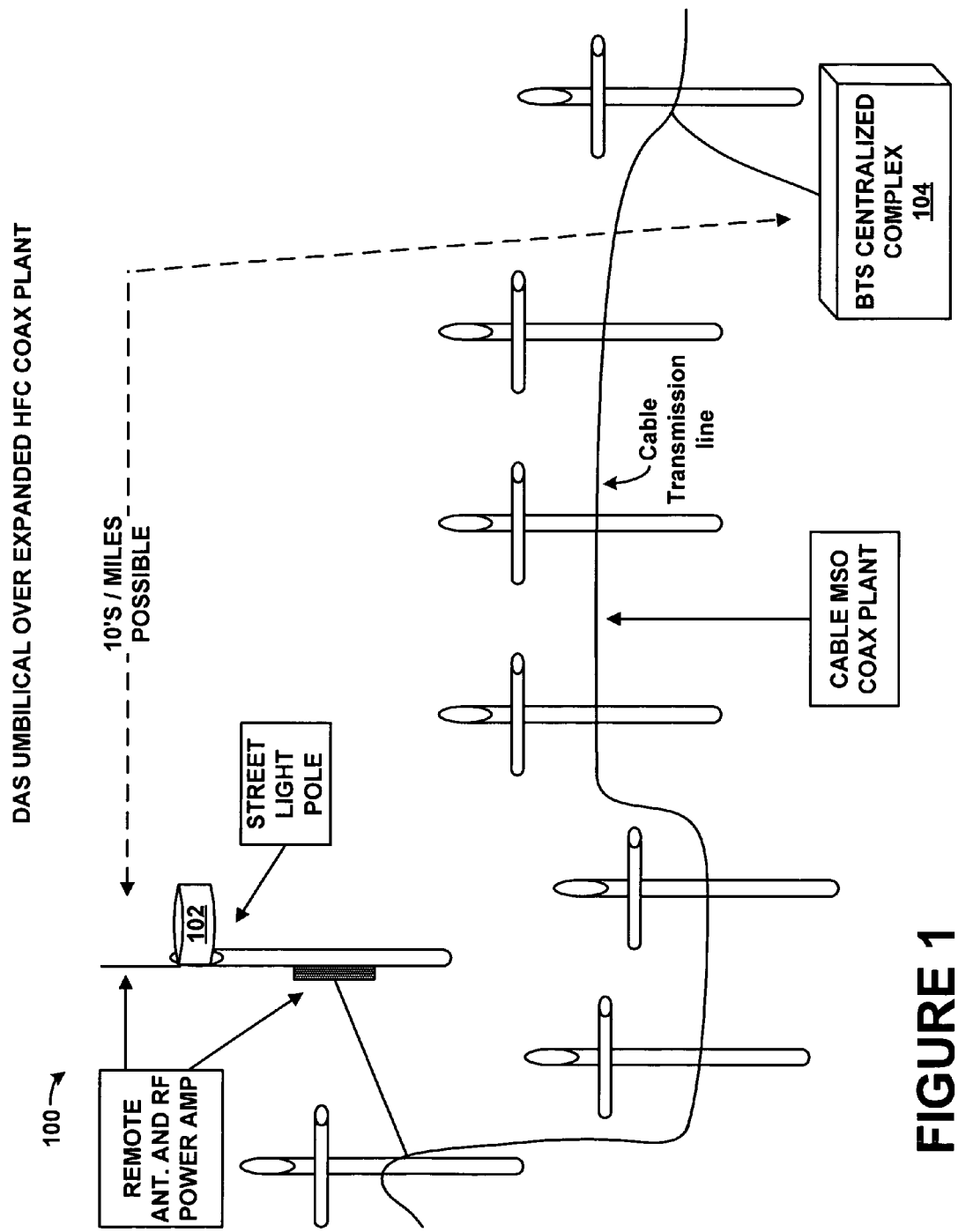
FIG. 1 illustrates one embodiment of a system for establishing a communication link between a remote antenna and a cellular base station via a cable television distribution network.

FIG. 1 illustrates an example of a system 100 for establishing a communication link between a remote antenna (mounted to a street light pole, for example) and a cellular BTS via a CATV network. The system includes a remote antenna 102 coupled to a cellular BTS 104 via a CATV transmission line (e.g., fiber or coaxial cable).

The remote antenna 102 may be positioned at a location remote from a base station, as shown in FIG. 1. The remote antenna 102 extends a coverage area of the cellular BTS 104 by enabling mobile devices to communicate with the cellular BTS 104 through the remote antenna 102. The remote antenna 102 includes a transceiver with a corresponding antenna that allow the remote antenna to communicate with mobile devices. The transceiver may communicate with mobile devices through the use of code division multiple access (CDMA) communications, for example.

The cellular BTS 104 (commonly referred to as a "cell phone tower") holds radio transceivers that define a cell site, and coordinates radio-link protocols with a mobile device. The BTS is the networking component of a mobile communications system from which signals are sent and received. A BTS is controlled by a base station controller (BSC) (not shown in FIG. 1).

The CATV network includes coaxial cable connecting subscribers to a cable multiple system operator (MSO) coax plant to deliver cable television service to the subscribers. As shown, the coax cable may be installed on conventional street light poles, or alternatively, underground.

Cable television service provides entertainment and information by broadcasting a set of 6 MHz TV signals from a central site, e.g., the cable MSO plant, to many subscribers throughout a community or area by means of a transmission medium employing optical fiber and/or coaxial cable. Many cable television networks are hybrid fiber/coaxial ("HFC") cable systems, in which fiber optic cables are used for backbone transmission lines, and coaxial cables are used to connect the subscribers to the backbone. Cable television networks typically use a passband ranging from about 54 MHz to over 300 MHz for the transmission of signals in the downstream direction, i.e., to the subscribers. The signals typically include analog television signals, which may be in the NTSC, PAL, or other format. The signals may also include digital television signals, such as in a high definition television ("HDTV") format.

The passband is normally divided into a series of frequency channels, in accordance with a predetermined "channel plan" or "frequency plan." Cable television networks in the United States typically use one of three channel plans: the "standard" channel plan, the incrementally related carrier ("IRC") channel plan, or the harmonically related carrier ("HRC") channel plan. The "standard plan," which is set forth in the Electronic Industry Association's Interim Standard IS-6, provides a series of 6 MHz channels, with the lower edge of each channel set at an integral number of megahertz. For example, the lower edge of "Channel 2" in the standard plan is 54 MHz. The channels in an IRC channel plan are also 6 MHz wide and their frequencies are largely the same as those in the standard plan. However, the IRC channel plan also provides channels in the 72 MHz to 90 MHz range, whereas the standard plan does not. In an HRC channel plan, the channels are also 6 MHz wide, but it is the visual carrier that is set at an integral number of megahertz in each channel, rather than the lower channel edge. Thus, the lower edge of "Channel 2" is 52.75 MHz, with the visual carrier at 54 MHz. The frequency channels are located in a downstream passband that typically ranges from about 54 MHz to anywhere from 300 MHz to 1 GHz.

A CATV network typically provides vendor-defined capacity, typically asymmetric. To provide support for a communication link between a remote antenna and a cellular BTS, and particularly to support QAM digitized signaling, the CATV network needs to support approximately 1.4 Gbps signal transmission. However, present HFC CATV systems are generally limited to a bandwidth of 750 MHz with little uplink bandwidth, and transport bandwidth is limited to 10's of Mbps. For example, typical CATV systems have upstream capacity in the frequency range of 5-42 MHz or six 6 MHz channels, and downstream capacity in the frequency range of 50-850 MHz or 130 channels, which is not enough capacity to enable a two-way 1.42 Gbps symmetrical transmission. In fact, using current CATV systems as a communication link for cellular communications, half of all downstream capacity would be used for just one remote antenna and the upstream capacity could handle only about 144 Mbps when 1.42 Gbps is desired. Further, bandwidth for half of the TV channels would be eliminated and all other upstream applications like cable modem traffic would be eliminated to account for the communications between one remote antenna and a cellular BTS. Thus, current CATV systems cannot support today's high capacity DAS systems that could have 400 conversations ongoing in a busy hour in the 15 MHz of spectrum extended to the remote antenna. Thus, in one embodiment, to enable cellular communications over the CATV network, bandwidth in current CATV architectures is expanded by increasing two-way spectral capacity, and the Generic Frame Protocol (GFP) and virtual concatenation are utilized to bond incremental bandwidth channels together to create large contiguous transmission pipes to meet cellular communication transport requirements.

As an example, bandwidth within CATV networks can be increased using a technology provided by Xtend Networks of Palo Alto, Calif. (a Vyyö Company), which developed a technique for increasing capacity of cable networks to 3 GHz. Using this technology, ample symmetrical capacity could be provided to enable current CATV networks to be used as a communication link between a remote antenna and a cellular BTS, as well as to be used to provide TV, HDTV and cable modem data traffic transmission simultaneously over a single coax system.

Figure 2:
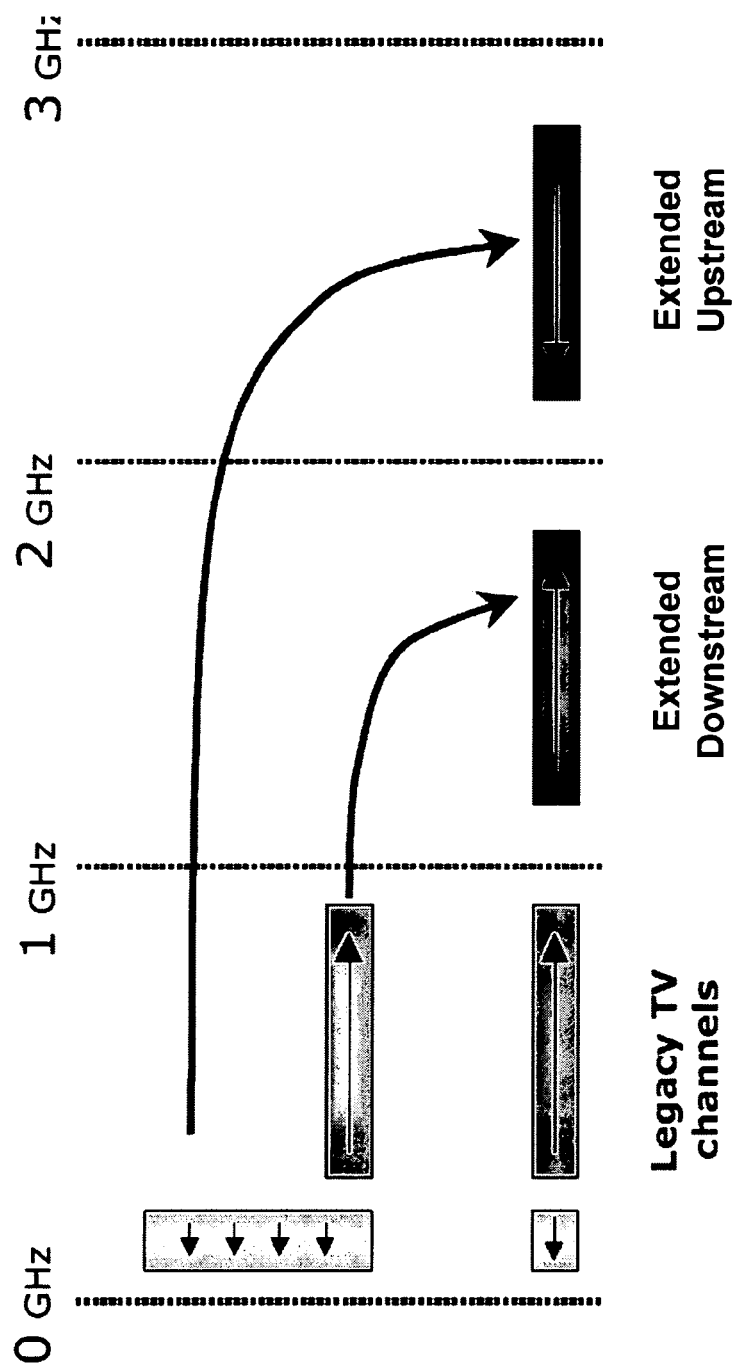
FIG. 2 illustrates example uses of the frequency spectrum to transfer data over a cable television distribution network.

Briefly, to extend the capacity of current CATV networks, bandwidth in the range from 900 MHz to 3 GHz can be utilized. In particular, 700 MHz of bandwidth between about 1 GHz to 2 GHz can be opened up for downstream data delivery, and bandwidth between about 2250-2750 MHz can be used for upstream data delivery. In this manner, the existing 5-860 MHz band can remain intact for conventional cable TV data transmission. This is illustrated in FIG. 2.

There are other approaches to generating more information capacity in a cable system. For example, digital modulation density can be increased from 256 QAM to 1024 QAM, other digital video compression technologies could be used, such as MPEG-4, or a switched digital video technique can be implemented to avoid sending low-usage channels to subscriber groups except when requested. Other techniques are possible as well, such as "overlashing" additional coaxial cable over existing CATV cable to be used solely for cellular communications so as to dedicate a second group of CATV transmission lines to remote antenna signaling.

Using any of these or other techniques for increasing data transmission capacity, bandwidth in current CATV networks can be increased to include additional signaling on additional frequency bands. FIG. 3 illustrates a modified CATV network used as a communication link between a remote antenna 202 and a cellular BTS 212. The remote antenna 202 is coupled to CATV coaxial cable 208 through a digitizer 204 and a concatenator 206. The BTS 212 receives data through the CATV cabling 208 from a demodulator 210.

The remote antenna 202 receives signals from mobile stations, such as cell phones, and sends the signals to a digitizer 204, which encapsulates and modulates data from the signals onto carrier waves. For example, the digitizer 204 may use GFP (Generic Framing Procedure) to encapsulate the data, and then digitize the encapsulated data using quadrature amplitude modulation (QAM) (as shown in the network illustrated in FIG. 4).

GFP defines a mapping of data signals into SONET/SDH (Synchronous Optical Network/Synchronous Digital Hierarchy) payloads to allow SONET/SDH to transport non-TDM (Time Division Multiplexing) traffic more efficiently. In particular, GFP, defined in ITU standard G.7041, which is herein entirely incorporated by reference, provides a framing mechanism that supports the direct mapping of various data traffic types into SONET/SDH frames, giving protocols like Ethernet and Fiber Channel the flexibility to be carried over long distances on an existing SONET/SDH infrastructure. A GFP frame includes a core header, a payload header and a payload area. The core and payload headers form the GFP header, and the payload area represents customer data-service traffic. The payload header includes information about a payload type (e.g., Ethernet, Fiber Channel, etc.) that is being carried, while the core header includes information about a size of the GFP frame itself. Together, these components form a GFP frame, which can be mapped into carrier channels to be transported over SONET/SDH networks.

GFP defines two types of client signals: (i) frame-mapped GFP for PDU-oriented (Protocol Data Unit) signals such as IP/PPP or Ethernet MAC, for example, and (ii) transparent-mapped GFP for block-oriented signals such as Fiber Channel and ESCON (Enterprise Systems Connection). Frame-mapped GFP encapsulates higher layer protocol frames (such as Ethernet and IP) in which the signal frame is mapped in its entirety onto one GFP frame, while transparent-mapped GFP provides block level encapsulation of bit streams whereby block-coded characters are decoded and then mapped into a fixed-length GFP frame and may be transmitted immediately without waiting for the receipt of an entire client data frame. GFP provides a flexible and robust encapsulation technology that supports both fixed and variable length frames. Unlike HDLC (High-Level Data Link Control), GFP does not use any special character for frame delineation. GFP generalizes an ATM (Asynchronous Transfer Mode) frame delineation mechanism to encapsulate variable length frames. The frame delineation is based on the length of the current payload and an error control check.

After data encapsulation, the digitizer 204 modulates the data using, for example, QAM, which is a modulation scheme that conveys data by changing (modulating) the amplitude of two carrier waves in response to a data signal. The two waves, usually sinusoids, are out of phase with each other by 90° and are thus referred to as quadrature carriers. Phase modulation (analogue PM) and phase-shift keying (digital PSK) can be regarded as a special case of QAM, where the amplitude of the modulating signal is constant, with only the phase varying.

In digital QAM, constellation points (i.e., representation of the data points digitally modulated in the complex plane) are usually arranged in a square grid with equal vertical and horizontal spacing, although other configurations are possible. The number of points in the grid is usually a power of 2 (2, 4, 8 . . . ), and common forms are 16-QAM, 64-QAM, 128-QAM and 256-QAM, for example. By moving to a higher-order constellation, it is possible to transmit more bits per symbol.

Thus, the digitizer 204 may include a 256-QAM modulator to digitize the data signals for transmission across the CATV cable 208. However, prior to data transmission, the modulated signals are sent to the concatenator 206, which processes the signals for transmission across a CATV network.

The CATV data transmission network is configured to transmit signals 10's of Mbps over 6 MHz channels; however, to transmit cellular communications, a 1.42 Gbps channel is needed, not the separate 6 MHz channels that CATV normally carries. Thus, the concatenator 206 virtually, bonds some of the 6 MHz channels together to create a large transmission path to enable an approximate 1.42 Gbps transmission path. In this manner, a large transmission pipe is created using standard CATV signaling (rather than adding a proprietary 100 MHZ channel, for example).

To concatenate channels to create a contiguous 1.42 gigabit link that enables transmission of cellular communications, techniques similar to those used within a SONET can be used. Two approaches exist for concatenation: contiguous and virtual. Both provide concatenated bandwidth of X-times container-N at a path termination. However, contiguous concatenation keeps the concatenated payload through the whole SONET/SDH transport. Therefore, network elements involved in the data transport must support contiguous concatenation from the source to the destination and at every intermediate node. As an example of contiguous concatenation, four consecutive 6 MHz channels (or more if necessary) can be concatenated into a single "pipe." Data in each channel can be interleaved together with the data of the other channels. The interleaving format may be rigid. If so, every data segment in the pipe belongs to the same channel.

Virtual Concatenation (VCAT) relaxes the "rigidity" of SONET/SDH payloads originally designed for TDM traffic. VCAT allows the concatenation of multiple payload frames from VT1.5 (Virtual Tributary) to STS-3c SPE (Synchronous Transport Signal, Synchronous Payload Envelope), for example, to better scale requirements for incremental data bandwidth. Using virtual concatenation, data frames are divided into separate signals (e.g., for OC-12 signals (Optical Carrier-12), the data frames would be divided into 12° C.-1 signals), and transported individually through a network. Since each separate signal contains its own path overhead data, the position/sequence of each data path is tracked, as well as the original group to which each separate signal belongs. The separate signals can be transported via OC-1 bandwidth pipes, or, more likely, combined with other data on OC-12 or OC-48 SONET lines. At the termination end point, the separate signals can be recombined. Using the virtual concatenation algorithm, individual payloads can be buffered until all separate signals corresponding to the original group arrive at the destination.

Figure 5:
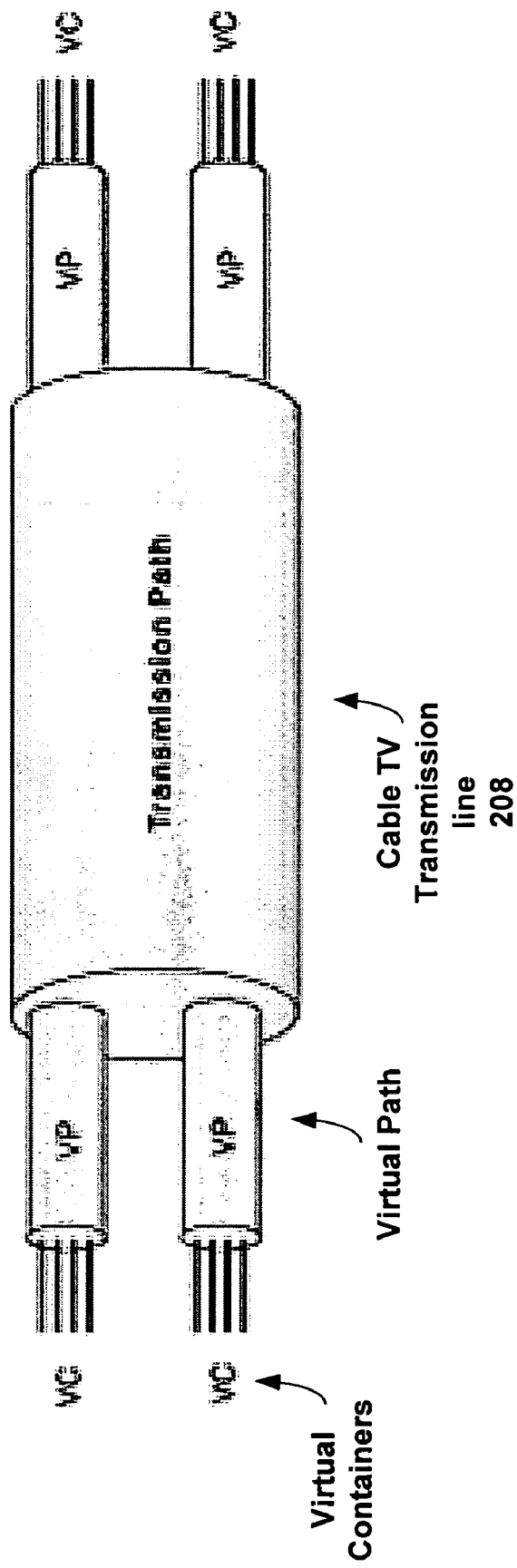
FIG. 5 conceptually illustrates one example of virtual concatenation of signals.

FIG. 5 conceptually illustrates virtual concatenation of signals. In the figure, the transmission path includes the multiple 6 MHz channels over which the CATV network transmits data. The concatenator 206 will receive the digitized signals from the digitizer 204 and breaks the payload into individual Virtual Containers (VC). Each VC is logically part of a Virtual Concatenated Group (VCG). Each VCG member is routed and transported individually across the coaxial cable 206 over a virtual path (VP) (e.g., a CATV channel), and is recombined with the other VCs at the demodulator 210 to form the whole VCG, which is then forwarded to the cellular BTS 212. Therefore, network elements only need to support virtual concatenation at the source and at the destination, but intermediate nodes do not need to be aware of the virtual concatenation.

Referring back to FIG. 4, another example of a modified CATV network used as a communication link between the remote antenna 202 and the cellular BTS 212 is illustrated. As shown, the remote antenna 202 may be connected through a fiber-optic link 214 to a QAM modulator 216, which outputs to the concatenator 206. The concatenator 206 is shown to include a down converter 218 to divide data into separate signals, and broadband amplifiers 220 to facilitate transmission of the data signals across the CATV cabling 208. The demodulator 210 will receive the individual signals, recombine the data signals, and then forward the data signals to the cellular BTS 212. Using this modified CATV network, frequency spectrum of the network is converted to a 1.42 Gbps proprietary digital signal.

Of course, for upstream communications, e.g., from the cellular BTS 212 to the remote antenna 202, the cellular BTS 212 would connect to a digitizer and concatenator to send data to a demodulator that is coupled to the remote antenna that receives and recombines the data signals.

Using embodiments described above, a method to enable DAS signaling requiring 1.42 Gbps symmetrical transmission over coax (e.g., CATV plant) includes increasing symmetrical 6 MHz channel capacity to enable a large transmission path, using high order QAM to digitize the channels into SONET signal payloads (e.g., OCn's), and using GFP and VCAT technologies to create multiple gigabit symmetrical transmission paths. A DAS can then use a CATV infrastructure as an umbilical to place antennas remotely from BTS equipment, for example.

Figure 6:
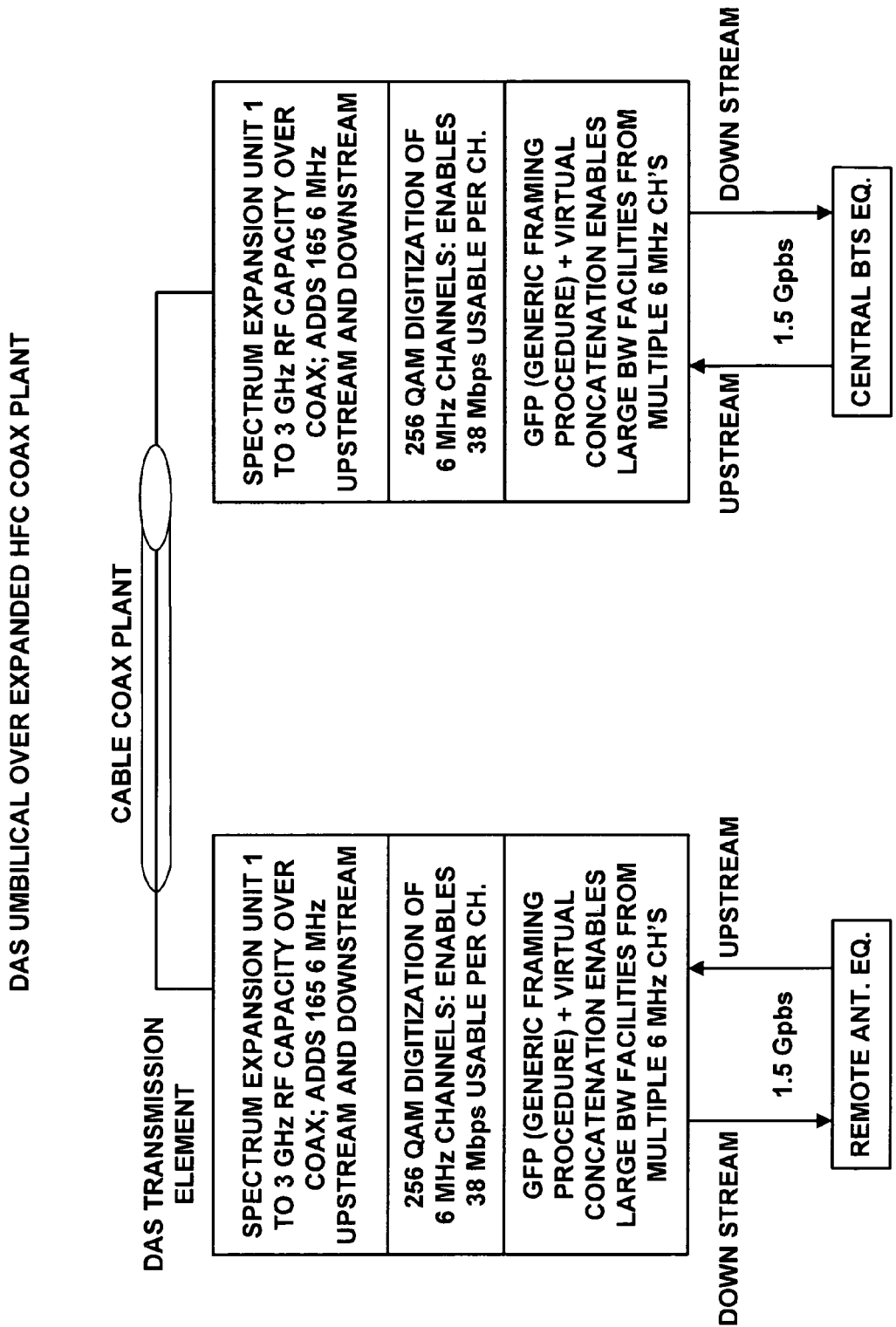
FIG. 6 is a diagram depicting functional steps according to one embodiment of the present application.

FIG. 6 summarizes embodiments of the present application. As shown, CATV spectrum is expanded to the 3 GHz frequency range, adding 1 GHz of spectrum or approximately 165 6 MHz channels for upstream and downstream data communication. A remote antenna will receive wireless signals from mobile stations, and using 256-QAM digitization of the 6 MHz channels enables 38 Mbps per channel. Further, using GFP and VC, large bandwidth capabilities, e.g., about 1.5 Gbps, are possible over the CATV coax cable from multiple 6 MHz channels.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method of communicating between a remote antenna and a cellular wireless base station (BTS) via a cable television (CATV) distribution network comprising:
digitizing data channels of the CATV distribution network to produce an amount of data bandwidth per channel; and
concatenating a plurality of the digitized channels together to form a single transmission path to provide an aggregate data channel for carrying traffic between the cellular wireless BTS and the remote antenna.

2. The method of claim 1, wherein the cellular wireless BTS includes radio transceivers to produce a respective radiation pattern defining a cell site within which a mobile device may communicate wirelessly with the cellular wireless BTS.

3. The method of claim 1, wherein the CATV distribution network includes coaxial cable connecting subscribers to a cable multiple system operator (MSO) coax plant that delivers cable television service to the subscribers in the frequency range of about 5 MHz to about 860 MHz.

4. The method of claim 3, wherein the remote antenna and the cellular wireless BTS are connected through the coaxial cable of the CATV distribution network.

5. The method of claim 1, wherein digitizing data channels of the CATV distribution network to produce the amount of data bandwidth per channel comprises digitizing 6 MHz data channels of the CATV distribution network.

6. The method of claim 1, wherein concatenating the plurality of the digitized channels together to provide the aggregate data channel for carrying traffic between the cellular wireless BTS and the remote antenna comprises concatenating at least a number of digitized data channels that would result in an aggregate data channel being able to carry approximately 1.42 Gbps.

7. The method of claim 1, further comprising using a frequency range between about 1 GHz to about 2 GHz for communications from the cellular wireless BTS to the remote antenna.

8. The method of claim 1, further comprising using a frequency range between about 2.250 GHz to about 2.750 GHz for communications from the remote antenna to the cellular wireless BTS.

9. The method of claim 1, wherein concatenating the plurality of the digitized channels together to provide the aggregate data channel for carrying traffic between the cellular wireless BTS and the remote antenna comprises using contiguous concatenation.

10. The method of claim 1, wherein concatenating the plurality of the digitized channels together to provide the aggregate data channel for carrying traffic between the cellular wireless BTS and the remote antenna comprises using virtual concatenation.

11. A method of communicating between a remote antenna and a cellular wireless base station (BTS) via a cable television (CATV) distribution network comprising:

receiving at the remote antenna signals from mobile devices;

encapsulating data within the signals using the generic framing procedure (GFP);

digitizing the encapsulated data;

virtually concatenating a plurality of channels of the CATV distribution network to form a single transmission path to provide an aggregate data channel for carrying the encapsulated data between the cellular wireless BTS and the remote antenna; and sending the encapsulated data from the remote antenna to the cellular wireless BTS via the concatenated channels of the CATV distribution network.

12. The method of claim 11, wherein virtually concatenating the plurality of channels of the CATV distribution network comprises dividing the encapsulated data into separate data signals, and transporting the separate data signals individually through the CATV distribution network.

13. The method of claim 12, further comprising recombining the separate data signals at the cellular wireless BTS.

14. The method of claim 13, wherein the separate data signals correspond to a group of data, the method further comprising buffering the separate data signals at the cellular wireless BTS until all the separate data signals corresponding to the group arrive at the cellular wireless BTS.

15. The method of claim 11, wherein digitizing the encapsulated data comprises using quadrature amplitude modulation (QAM).

16. A system comprising:

a cellular wireless base station producing a radiation pattern defining a cell site within which mobile devices may communicate wirelessly with the cellular wireless base station;

a remote antenna coupled to the cellular wireless base station and extending a coverage area of the cell site; and a cable television distribution network providing a communication link between the remote antenna and the cellular wireless base station, wherein data channels of the cable television distribution network are digitized to produce an amount of data bandwidth per channel and a plurality of the digitized channels are concatenated together to form a single transmission path to provide an aggregate data channel for carrying data between the cellular wireless BTS and the remote antenna.

17. The system of claim 16, wherein the cable television distribution network includes transmission lines connecting subscribers to a cable system that delivers cable television service to the subscribers by broadcasting a set of 6 MHz signals.

18. The system of claim 17, wherein the cable television distribution network concatenates at least a number of digitized channels that would result in an aggregate data channel being able to carry approximately 1.42 Gbps.

19. The system of claim 16, wherein data is transferred over the cable television distribution network from the cellular wireless base station to the remote antenna using a frequency range between about 1 GHz to about 2 GHz.

20. The system of claim 16, wherein data is transferred over the cable television distribution network from the remote antenna to the cellular wireless base station using a frequency range between about 2.250 GHz to about 2.750 GHz.

* * * * *